United States Patent
Lamb

(10) Patent No.: US 7,164,450 B2
(45) Date of Patent: Jan. 16, 2007

(54) REMOTE CONTROL

(76) Inventor: T. Gordon Lamb, 8725 Creekstone Way, Gainesville, GA (US) 30506

( * ) Notice: Subject to any disclaimer, the term of this patent is extended or adjusted under 35 U.S.C. 154(b) by 464 days.

(21) Appl. No.: 10/300,527

(22) Filed: Nov. 20, 2002

(65) Prior Publication Data
US 2003/0103168 A1    Jun. 5, 2003

Related U.S. Application Data

(63) Continuation-in-part of application No. 09/251,856, filed on Feb. 17, 1999, now abandoned.

(51) Int. Cl.
*H04N 5/50* (2006.01)
*H04N 5/44* (2006.01)

(52) U.S. Cl. .................. 348/734; 348/14.05; 725/46; 340/426.13

(58) Field of Classification Search .............. 348/734, 348/731, 732, 725, 14.05; 725/46, 47, 49, 725/38, 14, 58; 340/426.13, 426.14, 825.69, 340/825.72
See application file for complete search history.

(56) References Cited

U.S. PATENT DOCUMENTS

| 5,410,367 | A | 4/1995 | Zahavi et al. |
| 5,436,676 | A | 7/1995 | Pint et al. |
| 5,444,499 | A | 8/1995 | Saitoh |
| 5,517,256 | A | 5/1996 | Hashimoto |
| 5,557,338 | A | 9/1996 | Maze et al. |
| 5,564,088 | A | 10/1996 | Saitoh |
| 5,585,865 | A | 12/1996 | Amano et al. |
| 5,621,484 | A | 4/1997 | Cotty |
| 5,652,613 | A | 7/1997 | Lazarus et al. |
| 5,657,414 | A | 8/1997 | Lett et al. |
| 5,659,653 | A | 8/1997 | Diehl et al. |
| 5,682,206 | A | 10/1997 | Wehmeyer et al. |
| 5,710,605 | A | 1/1998 | Nelson |
| 5,872,588 | A * | 2/1999 | Aras et al. .................... 725/14 |
| 6,040,867 | A | 3/2000 | Bando et al. |
| 6,215,531 | B1 | 4/2001 | Beery |
| 6,532,592 | B1 * | 3/2003 | Shintani et al. ............. 725/141 |
| 6,597,374 | B1 * | 7/2003 | Baker et al. ................. 715/717 |
| 6,882,299 | B1 * | 4/2005 | Allport ........................ 341/176 |

* cited by examiner

*Primary Examiner*—David Ometz
*Assistant Examiner*—Jean W. Désir
(74) *Attorney, Agent, or Firm*—Myers & Kaplan, LLC; Greg O'Bradovich, Esq.; Barry E. Kaplan, Esq.

(57) ABSTRACT

An improved remote control that includes a manual alert mechanism for alerting and providing channel information to television viewer when a regularly viewed television program is about to begin. The improved remote control preferably includes an alerting mechanism having an automatic alert mode whereby, in addition to providing the audible and visual alerting alarms and the channel information of the manual alert mechanism, the automatic alert mode causes the remote control to turn on the television if it is not currently on and to tune the television to the channel of the desired program. In addition, if desired, the improved remote control includes a microprocessor circuit that includes a manual programming mode for entering time, day and channel information to receive an alert for a desired program, and an automatic program mode that compares the viewing habits of the remote control users to one or more predetermined viewing patterns that are stored in the microprocessor circuit and that automatically programs a time, day and channel alerting event when the user's viewing habits match with one of the predetermined viewing patterns.

13 Claims, 4 Drawing Sheets

REMOTE CONTROL

This application is a continuation-in-part of U.S. Utility patent application Ser. No. 09/251,856, filed Feb. 17, 1999, now abandoned entitled "Improved Remote Control".

BACKGROUND OF THE INVENTION

I. Field of the Invention

The present invention relates to remote controls for televisions and more particularly to an improved remote control for televisions that includes an alerting mechanism, a liquid crystal display and a microprocessor circuit that can be manually programmed by a user through buttons on the remote control having a menu screen allowing access to the day, time and channel information for a desired program that can be set into the auto program mode whereby the microprocessor circuit stores time, day and channel information when the microprocessor circuit recognizes predetermined viewing patterns; that includes a manual alert mode that provides an audible alerting alarm, a visual alerting alarm and a display of the stored channel for a desired program when the microprocessor circuit detects the time and day of a programed viewing event; and that include an automatic alert mode that generates all of the activities of the manual alert mode and further causes the remote control to transmit a channel change signal for changing the television receiver to the programmed channel. The device further includes a memory screen functional through the microprocessor and activated by a discrete push button, accessible through the menu screen which allows the user to scroll through the above-noted functions. Further, the memory screen allows access by the user to enter information concerning the date, time and channel the user had previously saved. The memory screen also allows the user to program the device to automatically delete past entered items once the specific item has become obsolete.

II. Description of the Related Art

Many individuals enjoy some television programs to the extent that they are disappointed when for one reason or another the regularly viewed and anticipated television program is missed. It would be a benefit, therefore, to have a remote control for televisions that included a manual alert mechanism that would provide an alert and channel information to television viewer when a regularly viewed television program is about to begin so that the television viewer is given the opportunity to change the channel if the viewer is currently watching another program or to turn on the television if the viewer is engaged in another activity such as reading, crocheting or talking on the telephone. Because an audible and visual alarm may not attract the television viewers attention, it would be a further benefit to have a remote control for televisions that further included an automatic alert mode whereby, in addition to providing the audible and visual alerting alarms and the channel information of the manual alert mechanism, the automatic alert mode caused the remote control to turn on the television if it was not currently on and to tune the television to the channel of the desired program. Because many individuals find it difficult to program electronic equipment, it would of course be a further benefit if the remote control included a microprocessor circuit that in addition to a manual programming mode included an automatic program mode that would compare the viewing habits of the remote control users to one or more predetermined viewing patterns that were stored in the microprocessor circuit and that would automatically program a time, day and channel alerting event when the viewing habits matched with one of the predetermined viewing patterns.

SUMMARY OF THE INVENTION

In accordance with the present invention and the contemplated problems which have and continue to exist in this field, it is an object of the invention to provide an improved remote control that includes a manual alert mechanism for alerting and providing channel information to television viewer when a regularly viewed television program is about to begin.

It is a further object of the invention to provide an improved remote control that includes an alerting mechanism having an automatic alert mode whereby, in addition to providing the audible and visual alerting alarms and the channel information of the manual alert mechanism, the automatic alert mode causes the remote control to turn on the television if it is not currently on and to tune the television to the channel of the desired program.

It is a still further object of the invention to provide an improved remote control that includes a microprocessor circuit that includes a manual programming mode for entering time, day and channel information to receive an alert for a desired program.

It is a still further object of the invention to provide an improved remote control that includes a microprocessor circuit that includes, in addition to a manual programming mode for entering time, day and channel information to receive an alert for a desired program, an automatic program mode that compares the viewing habits of the remote control users to one or more predetermined viewing patterns that are stored in the microprocessor circuit and that automatically programs a time, day and channel alerting event when the user's viewing habits match with one of the predetermined viewing patterns.

It is a still further object of the invention to provide an improved remote control that includes an alerting mechanism, a liquid crystal display and a microprocessor circuit that can be manually programmed by a user through buttons on the remote control with the day, time and channel information for a desired program; that be set into the auto program mode whereby the microprocessor circuit stores time, day and channel information when the microprocessor circuit recognizes predetermined viewing patterns; that includes a manual alert mode that provides an audible alerting alarm, a visual alerting alarm and a display of the stored channel for a desired program when the microprocessor circuit detects the time and day of a programed viewing event; and that include an automatic alert mode that generates all of the activities of the manual alert mode and further causes the remote control to transmit a channel change signal for changing the television receiver to the programmed channel.

It is a still further object of the invention to provide an improved remote control that accomplishes all or some of the above objects in combination.

Another object of the invention is the provision of a memory screen functional through the microprocessor and activated by a discrete push button which allows the user to scroll through the above-noted functions. Further, the memory screen allows access by the user to entered information concerning the date, time and channel the user had previously saved. The memory screen also allows the user to program the device to both manually and automatically delete past entered items once the specific item has become obsolete.

Other objects, advantages and capabilities of the invention will become apparent from the following description taken in conjunction with the accompanying drawings showing the preferred embodiment of the invention.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DETAILED DESCRIPTION OF THE INVENTION

Figure 1:
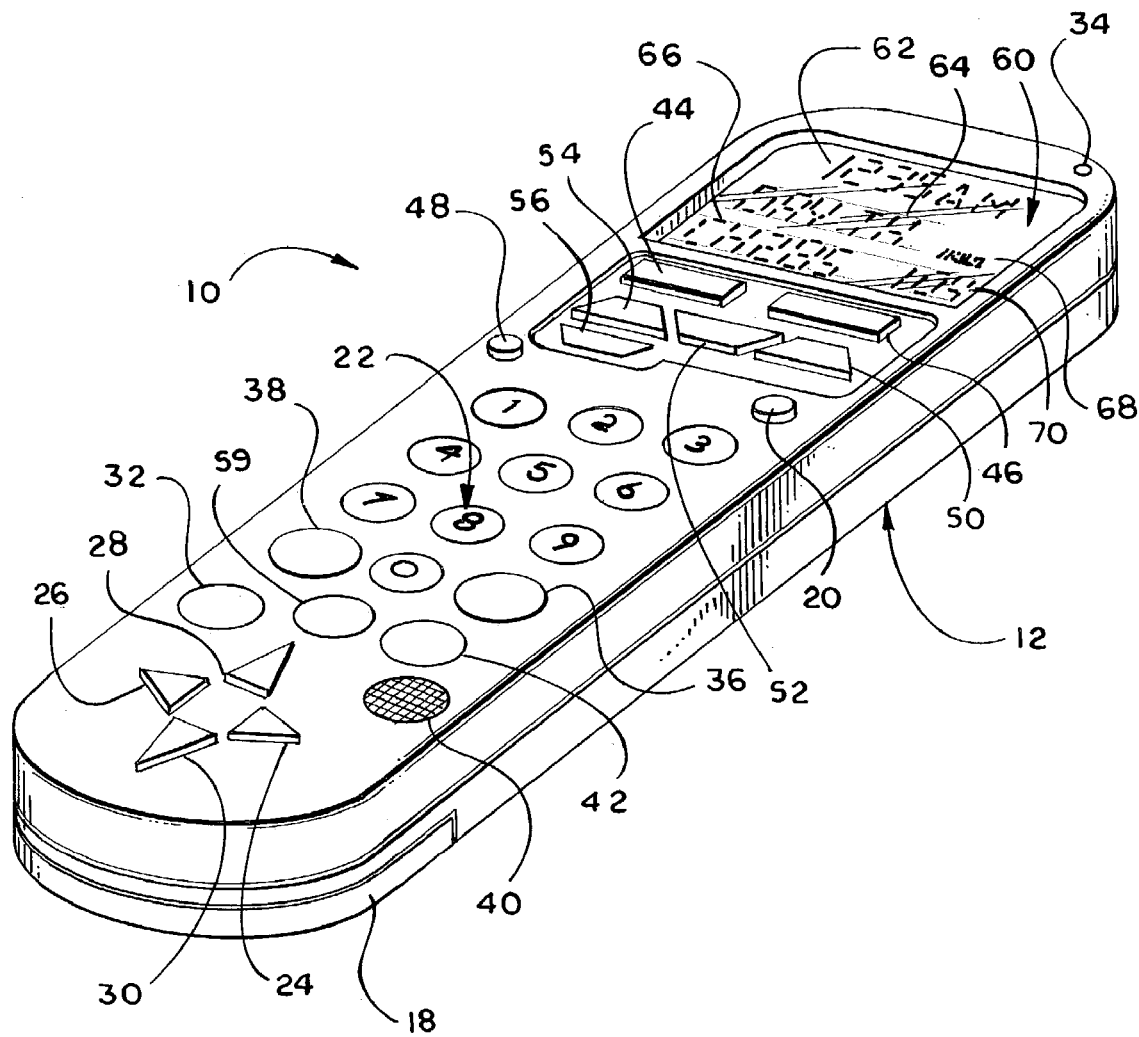
FIG. 1 is a perspective view of an exemplary embodiment of the improved remote control of the present invention showing the molded plastic remote housing within which the remote control electronics are housed and including a battery compartment access cover; the TV power on/off button; the 0–9 numerical input buttons; the up Volume button; the down Volume button; the up Channel button; the down Channel button; the Mute button; the power on LED; the Enter button; the Alert Buzzer grate; the Previous Channel button; the Manual Mode select button; the Automatic Mode select button; the Channel Program up button; the Channel Program down button; the Channel Program Set button; the Channel Program delete button, and the backlit liquid crystal display including display areas provided thereon for displaying the current or programmed time, the current or programmed day of the week, the last channel transmitted by the remote control, the Program Alert Icon, and the Alert channel Display.
Figure 4:
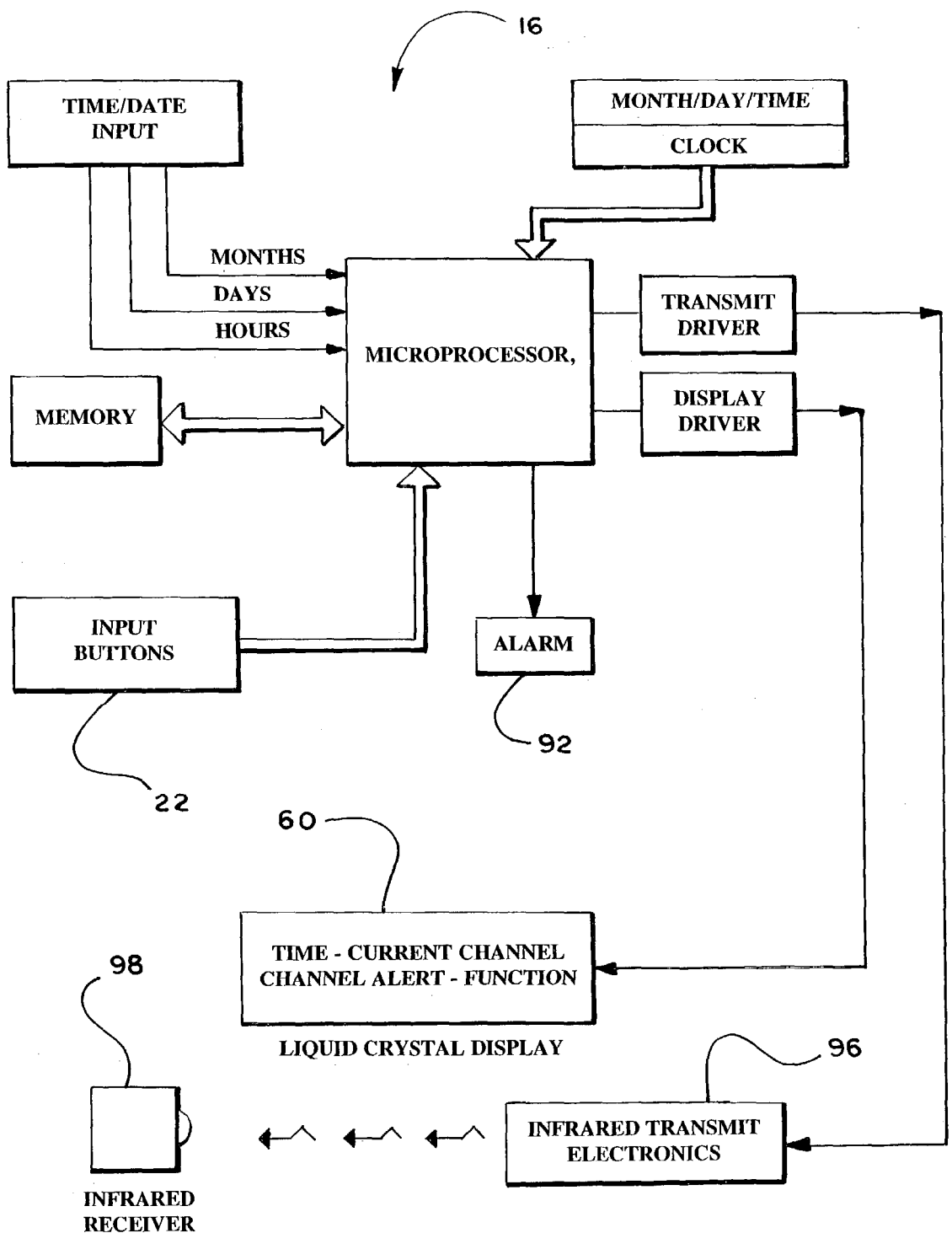
FIG. 4 is a block diagram of the exemplary improved remote control of the present invention showing the microprocessor, the audible alert buzzer, the remote control input buttons, the liquid crystal display output, the infrared transmitter circuit, and a representative infrared receiver of a television receiver.

Referring to the drawings wherein like reference numerals designate corresponding parts throughout the several figures, reference is made first to FIG. 1 which shows an exemplary embodiment of the improved remote control of the present invention generally designated by the numeral 10. The improved remote control 10 includes a molded plastic housing, generally designated as 12, within which the conventional remote control electronics and the microprocessor circuit, generally designated as 16 (see FIG. 4) of the improved remote 10 are housed. Housing 12 includes a conventional battery compartment access cover 18 for inserting batteries into a battery compartment formed within housing 12 that are used to power the conventional remote control electronics and microprocessor circuit 16 (FIG. 4). Remote control 10 includes a TV power on/off button 20; ten numerical input buttons, generally designated as 22, one for each numeral 0–9; an up Volume button 24; a down Volume button 26; an up Channel button 28; a down Channel button 30; a Mute button 32; a power on LED 34; an Enter button 36; an alert cancel button 38; an Alert Buzzer grate 40; a return to Previous Channel button 42; a Manual Mode select button 44; an Automatic Mode select button 46; an auto program mode select button 48; a Channel Program up button 50; a Channel Program down button 52; a Channel Program Set 54 button; a Channel Program delete button 56, a menu button 59, and a backlit liquid crystal display, generally designated as 60, including display areas provided thereon for displaying the current or programmed time 62, the current or programmed day of the week 64, the last channel transmitted by the remote control 66, the Program Visual Alert Icon 68, and the Alert channel Display 70.

The menu button 59 allows a user to access the memory of the microprocessor and to scroll through the menu to refresh the user's memory as to what has been placed into memory. The user can recall dates, times and channel programming information by accessing the menu and may easily delete and change, either automatically or manually, all such information.

Figure 2:
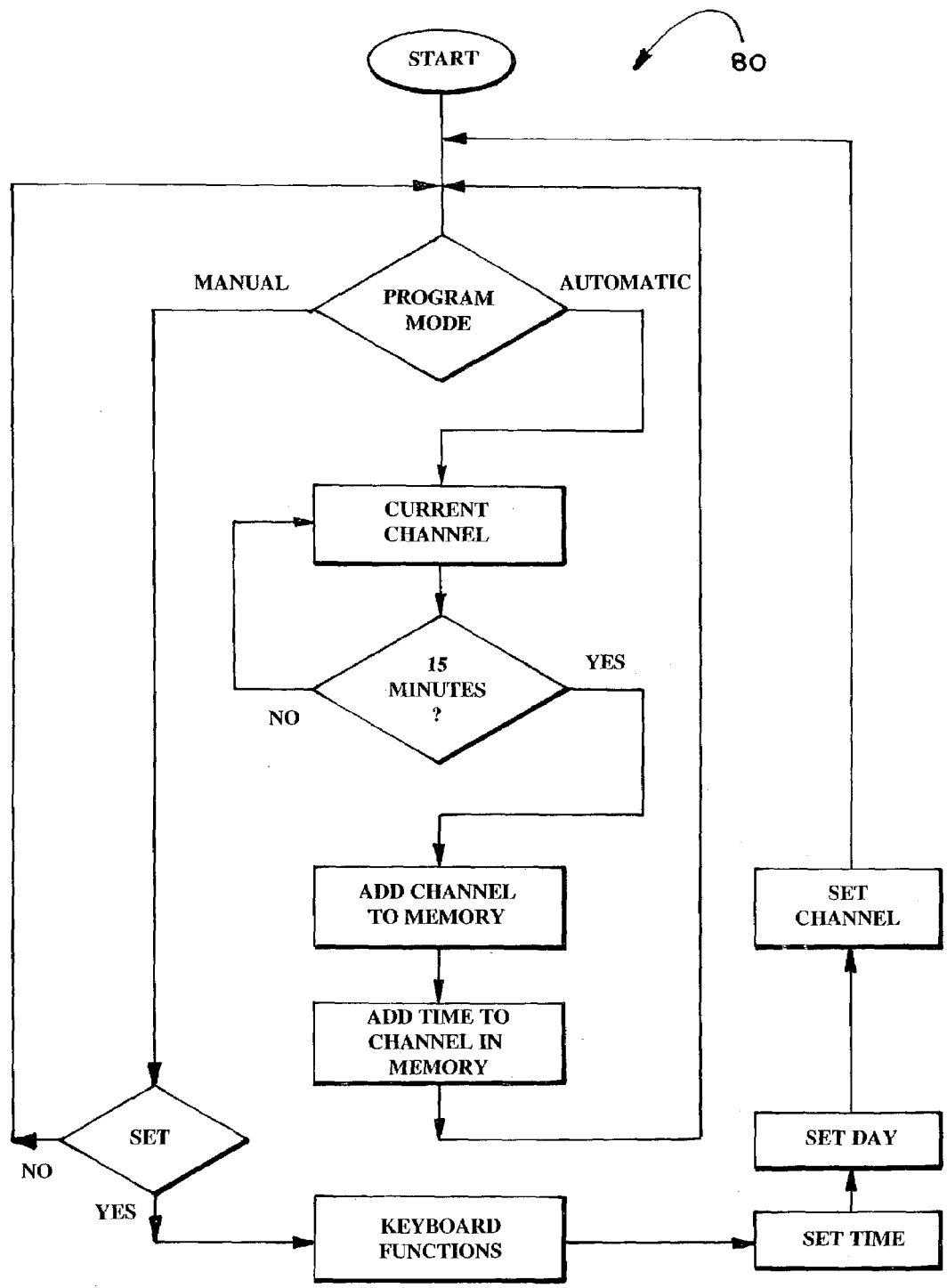
FIG. 2 is a flow chart illustrating the algorithm whereby the microprocessor circuit is programmed with channel and program time information in both the manual and automatic modes.
Figure 3:
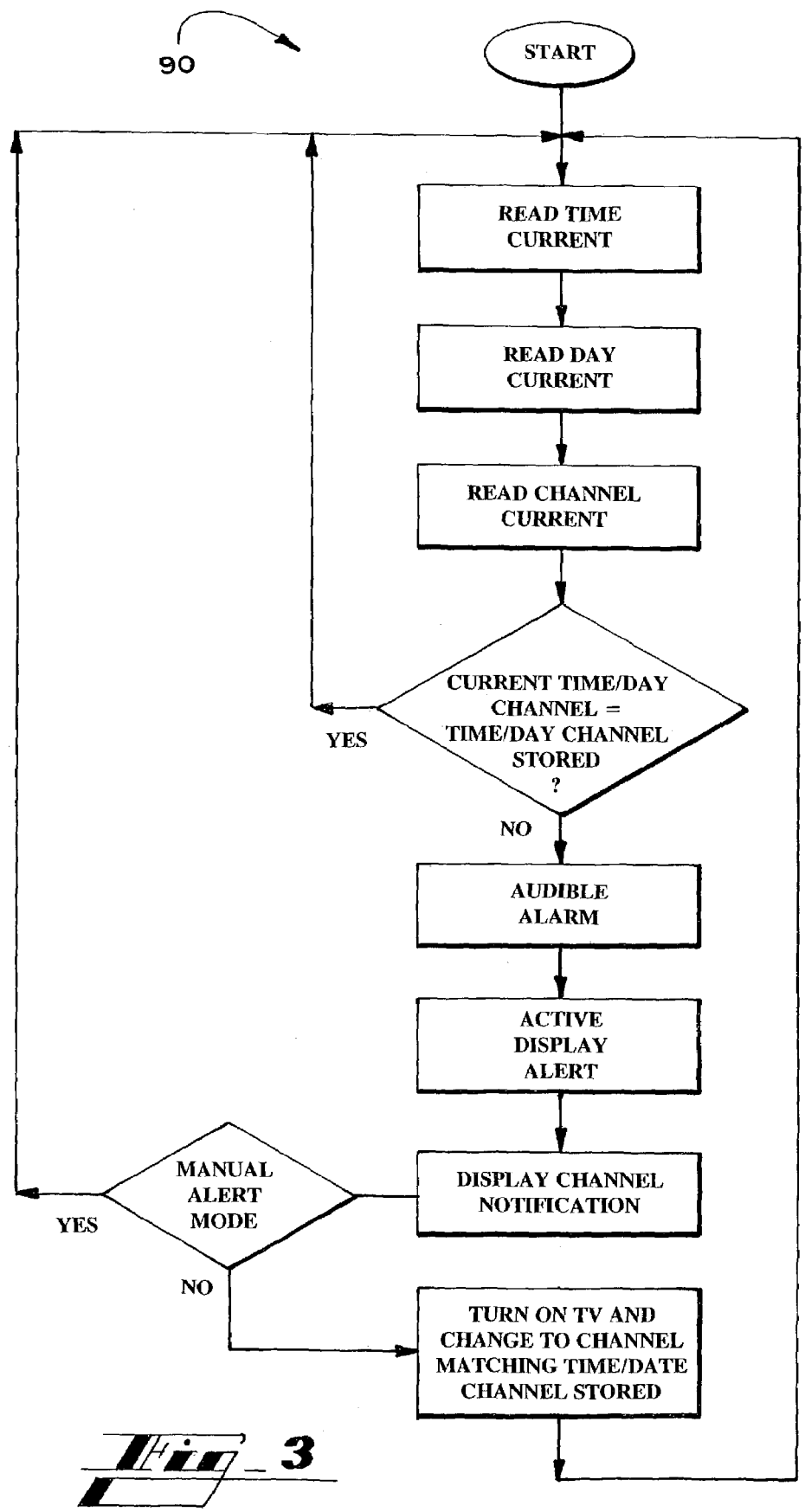
FIG. 3 is a flow chart illustrating the algorithm whereby the microprocessor circuit is programmed to continuously search for alert conditions and to output audible a visual alerting outputs in response to detecting an alert condition.

Referring to FIG. 2, a flow chart, generally designated as 80, illustrates the algorithm whereby microprocessor circuit 16 (FIG. 4) is programmed with channel and program time information in both the manual and automatic modes. Referring to FIG. 3, a flow chart, generally designated 90, illustrates the algorithm whereby microprocessor circuit 16 (FIG. 4) is programmed to continuously search for alert conditions and to output audible and visual alerting outputs in response to detecting an alert condition when in the manual alert mode and to further cause the convention remote control circuitry to turn on a TV receiver and to change the channel to the programmed channel when in the automatic alert mode.

FIG. 4 shows a block diagram of an exemplary microprocessor circuit 16 including an audible alert buzzer 92, remote control input buttons 22, liquid crystal display output 60, an infrared transmitter circuit 96 of the convention remote control, and a representative infrared receiver 98 of a representative television receiver.

It can be seen from the preceding description that an improved remote control has been provided that includes a manual alert 15 mechanism for alerting and providing channel information to television viewer when a regularly viewed television program is about to begin; that includes an alerting mechanism having an automatic alert mode whereby, in addition to providing the audible and visual alerting alarms and the channel information of the manual alert mechanism, the automatic alert mode causes the remote control to turn on the television if it is not currently on and to tune the television to the channel of the desired program; that includes a microprocessor circuit that includes a manual programming mode for entering time, day and channel information to receive an alert for a desired program and an automatic program mode that compares the viewing habits of the remote control users to one or more predetermined viewing patterns that are stored in the microprocessor circuit and that automatically programs a time, day and channel alerting event when the user's viewing habits match with one of the predetermined viewing patterns; and that includes an alerting mechanism, a liquid crystal display and a microprocessor circuit that can be manually programmed by a user through buttons on the remote control with the day, time and channel information for a desired program; that be set into the auto program mode whereby the microprocessor circuit stores time, day and channel information when the microprocessor circuit recognizes predetermined viewing patterns; that includes a manual alert mode that provides an audible alerting alarm, a visual alerting alarm and a display of the stored channel for a desired program when the microprocessor circuit detects the time and day of a programed viewing event; and that include an automatic alert mode that generates all of the activities of the manual alert mode and further causes the remote control to transmit a channel change signal for changing the television receiver to the programmed channel.

As was earlier pointed out, the menu button 59 accesses the memory of the microprocessor allowing the user to recall dates, times and channel programming information to permit the user to manually or automatically delete or change the original programming.

It is noted that the embodiment of the improved remote control described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. In a remote control having a number of function input buttons and an at-a-distance communication link with a control communication receiver of a television, the improvement comprising:

an alerting mechanism including an audible alerting alarm and a visual alerting alarm;

a liquid crystal display;

a microprocessor circuit in connection with said alerting mechanism, said liquid crystal display being connected to operational circuitry of the remote control;

said microprocessor circuit having a first operating program that enables said microprocessor circuit to be manually programmed by a user through the function input buttons on the remote control with day, time and channel information for a desired program; and said microprocessor circuit having a second operating program that enables said microprocessor circuit to be set into an auto program mode whereby said microprocessor circuit stores time, day and channel information when said microprocessor circuit recognizes predetermined viewing patterns provided within said second operating program, said second operating program recording viewing habits of a plurality of users, thereby storing a plurality of predetermined viewing patterns based on said viewing habits of said plurality of users in said microprocessor circuit, said second operating program further recognizing one of said plurality of viewing habits when one of the plurality of users is using said remote control, thereby activating said time, day and channel information specific to said one of the plurality of users.

2. A remote control as claimed in claim 1, wherein said microprocessor circuit has a third operating program that provides a manual alert mode that provides an audible alerting alarm, a visual alerting alarm and a display of a stored channel for a desired program when said microprocessor circuit detects a time and day of a programmed viewing event, said third operating program further accepting manual entry of time, day and channel information from each of said plurality of users, thereby allowing a plurality of manually entered time, day and channel information to be stored in said microprocessor circuit, and corresponding to the respective stored viewing habits of each of said plurality of users.

3. A remote control as claimed in claim 2, wherein said microprocessor circuit includes a fourth operating program that provides an automatic alert mode that generates all of the activities of said manual alert mode and further causes the remote control to transmit a television "on" signal to the television receiver if the television receiver is not already on and a channel change signal for changing the television receiver to the programmed channel.

4. A remote control as claimed in claim 3, wherein the remote control has a menu function button, the menu function button being capable of accessing a menu screen in the liquid crystal display, the menu screen being capable of interacting with the microprocessor circuit, the menu screen having indicia representing previously programmed information of day, time and channel for a desired program, function changing means on the remote control to manually modify the day, time and channel programming said menu screen including both said previously programmed information of day time and channel of said predetermined viewing pattern and said previously programmed information of day time and channel that was manually entered by each of said plurality of users.

5. A remote control as claimed in claim 3, wherein the remote control has a menu function button, the menu function button being capable of accessing a menu screen in the liquid crystal display, the menu screen being capable of interacting with the microprocessor circuit, the menu screen having indicia representing previously programmed information of day, time and channel for a desired program, function changing means on the remote control to automatically modify the day, time and channel programming.

6. In a remote control having a number of function input buttons and an at-a-distance communication link with a control communication receiver of a television, the improvement comprising:

an alerting mechanism including an audible alerting alarm and a visual alerting alarm;

a liquid crystal display;

a microprocessor circuit in connection with said alerting mechanism, said liquid crystal display being connected to operational circuitry of the remote control;

said microprocessor circuit having a first operating program that enables said microprocessor circuit to be manually programmed by a user through the function input buttons on the remote control with day, time and channel information for a desired program;

said microprocessor circuit having a second operating program that enables said microprocessor circuit to be set into an auto program mode whereby said microprocessor circuit stores time, day and channel information when said microprocessor circuit recognizes predetermined viewing patterns provided within said second operating program;

said second operating program recording viewing habits of a plurality of users, thereby storing a plurality of predetermined viewing patterns based on said viewing habits of said plurality of users in said microprocessor circuit, said second operating program further recognizing one of said plurality of viewing habits when one of the plurality of users is using said remote control, thereby activating said time, day and channel information specific to said one of the plurality of users;

said microprocessor circuit having a third operating program that provides a manual alert mode that provides an audible alerting alarm, a visual alerting alarm and a display of a stored channel for a desired program when said microprocessor circuit detects a time and day of a programmed viewing event, specific to said one of the plurality of users based on said viewing habits;

said microprocessor circuit having a fourth operating program that provides an automatic alert mode that generates all of the activities of said manual alert mode and further causes the remote control to transmit a television "on" signal to the television receiver if the television receiver is not already on and a channel change signal for changing the television receiver to the programmed channel; and the remote control has a menu function button, the menu function button being capable of accessing a menu screen in the liquid crystal display, the menu screen being capable of interacting with the microprocessor circuit, the menu screen having indicia representing previously programmed information of day, time and channel for a desired program, function changing means on the remote control to manually modify the day, time and channel programming.

7. A remote control as claimed in claim 6, wherein said third operating program further accepting manual entry of time, day and channel information from each of said plurality of users, thereby allowing a plurality of manually entered time, day and channel information to be stored in said microprocessor circuit, and corresponding to the respective stored viewing habits of each of said plurality of users.

8. A remote control as claimed in claim 7, wherein said second operating program and said third operating program provide a respective automatic and manual alert for each of said plurality of users based on the respective automatically recorded predetermined viewing pattern and the manual entry of time, day and channel information.

9. A remote control as claimed in claim 6, wherein said menu screen includes both said previously programmed information of day time and channel of said predetermined viewing pattern and said previously programmed information of day time and channel that was manually entered by each of said plurality of users.

10. In a remote control having a number of function input buttons and an at-a-distance communication link with a control communication receiver of a television, the improvement comprising:

an alerting mechanism including an audible alerting alarm and a visual alerting alarm;

a liquid crystal display;

a microprocessor circuit in connection with said alerting mechanism, said liquid crystal display being connected to operational circuitry of the remote control;

said microprocessor circuit having a first operating program that enables said microprocessor circuit to be manually programmed by a user through the function input buttons on the remote control with day, time and channel information for a desired program;

said microprocessor circuit having a second operating program that enables said microprocessor circuit to be set into an auto program mode whereby said microprocessor circuit stores time, day and channel information when said microprocessor circuit recognizes predetermined viewing patterns provided within said second operating program;

said second operating program recording viewing habits of a plurality of users, thereby storing a plurality of predetermined viewing patterns based on said viewing habits of said plurality of users in said microprocessor circuit, said second operating program further recognizing one of said plurality of viewing habits when one of the plurality of users is using said remote control, thereby activating said time, day and channel information specific to said one of the plurality of users said microprocessor circuit having a third operating program that provides a manual alert mode that provides an audible alerting alarm, a visual alerting alarm and a display of a stored channel for a desired program when said microprocessor circuit detects a time and day of a programmed viewing event;

said microprocessor circuit having a fourth operating program that provides an automatic alert mode that generates all of the activities of said manual alert mode and further causes the remote control to transmit a television "on" signal to the television receiver if the television receiver is not already on and a channel change signal for changing the television receiver to the programmed channel; and the remote control has a menu function button, the menu function button being capable of accessing a menu screen in the liquid crystal display, the menu screen being capable of interacting with the microprocessor circuit, the menu screen having indicia representing previously programmed information of day, time and channel for a desired program, function changing means on the remote control to automatically modify the day, time and channel programming.

11. A remote control as claimed in claim 10, wherein said third operating program further accepting manual entry of time, day and channel information from each of said plurality of users, thereby allowing a plurality of manually entered time, day and channel information to be stored in said microprocessor circuit, and corresponding to the respective stored viewing habits of each of said plurality of users.

12. A remote control as claimed in claim 11, wherein said second operating program and said third operating program provide a respective automatic and manual alert for each of said plurality of users based on the respective automatically recorded predetermined viewing pattern and the manual entry of time, day and channel information.

13. A remote control as claimed in claim 10, wherein said menu screen includes both said previously programmed information of day time and channel of said predetermined viewing pattern of each of said plurality of users, and said previously programmed information of day time and channel that was manually entered by each of said plurality of users.

* * * * *